(12) United States Patent
Wu

(10) Patent No.: US 7,098,781 B2
(45) Date of Patent: Aug. 29, 2006

(54) VEHICLE BRAKING ALERT SYSTEM

(76) Inventor: Ho Ling Wu, 235 Chung-Ho, Box 8-24, Taipei (TW)

( * ) Notice: Subject to any disclaimer, the term of this patent is extended or adjusted under 35 U.S.C. 154(b) by 240 days.

(21) Appl. No.: 10/715,291

(22) Filed: Nov. 14, 2003

(65) Prior Publication Data

US 2004/0113767 A1    Jun. 17, 2004

(51) Int. Cl.
*B60Q 1/44*    (2006.01)
(52) U.S. Cl. ............... 340/479; 340/467; 340/464; 340/539.1; 340/902
(58) Field of Classification Search ........... 340/479, 340/902
See application file for complete search history.

(56) References Cited

U.S. PATENT DOCUMENTS 3,210,726 A * 10/1965 Copsy ................ 340/902
4,706,086 A * 11/1987 Panizza ............... 340/902
5,289,182 A * 2/1994 Brillard et al. ......... 340/902
5,735,491 A * 4/1998 Atkinson .............. 246/124
6,359,552 B1 * 3/2002 King .................. 340/436
6,714,127 B1 * 3/2004 Perez et al. ............ 340/467

* cited by examiner

Primary Examiner—Benjamin C. Lee

(57) ABSTRACT

A vehicle braking alert system installed in a vehicle comprises a receiver installed at a head portion of the vehicle for receiving signals from a front vehicle; and transferring the received signals; a transmitter at a rear end of a vehicle for emitting signals to a vehicle behind the vehicle having the transmitter; a braking indicator at a rear side of the vehicle; and a signal processor receiving signals transferred from the receiver for determining to cause the transmitter to emit signals or cause the braking indicator to light up. By above components, when a first vehicle installed with the vehicle braking alert system brakes, the transmitter will emit signals to a second vehicle behind the vehicle and installed the vehicle braking alert system; the second vehicle receives the signals from the first vehicle so as to light up the braking indicator at the rear side thereof to alarm another vehicles.

2 Claims, 3 Drawing Sheets

VEHICLE BRAKING ALERT SYSTEM

FIELD OF THE INVENTION

The present invention relates to traffic safety devices, and particular to a vehicle braking alert system which can alert the front car conditions to some other cars behind a braking car.

BACKGROUND OF THE INVENTION

When a driver desires to brake or decelerate a car, the driver is only necessary to tread a treadle and then the brake lights will light up to alert the vehicles behind the car. Moreover, many cars add a further brake light, but these brake lights only cause a second car just behind the braking car to know the condition of the front car. As a result it is often that other cars behind the second car cannot know the condition of the front car, and thus some accidents occur due to this reason.

For a long time, no ideal braking system is designed to effectively resolve the prior art defect so that the cars at the rear side can know the front car condition at the first timing so as to increase the traffic safety.

SUMMARY OF THE INVENTION

Accordingly, the primary object of the present invention is to provide a vehicle braking alert system installed in a vehicle. The vehicle braking alarm system comprises a receiver installed at a head portion of the vehicle for receiving signals from a front vehicle; and transferring the received signals; a transmitter at a rear end of a vehicle for emitting signals to a vehicle behind the vehicle having the transmitter; a braking indicator at a rear side of the vehicle; and a signal processor receiving signals transferred from the receiver for determining to cause the transmitter to emit signals or cause the braking indicator to light up. By above components, when a first vehicle installed with the vehicle braking alert system brakes, the transmitter will emit signals to a second vehicle behind the vehicle and installed the vehicle braking alert system; the second vehicle receives the signals from the first vehicle so as to light up the braking indicator at the rear side thereof to alarm another vehicles.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
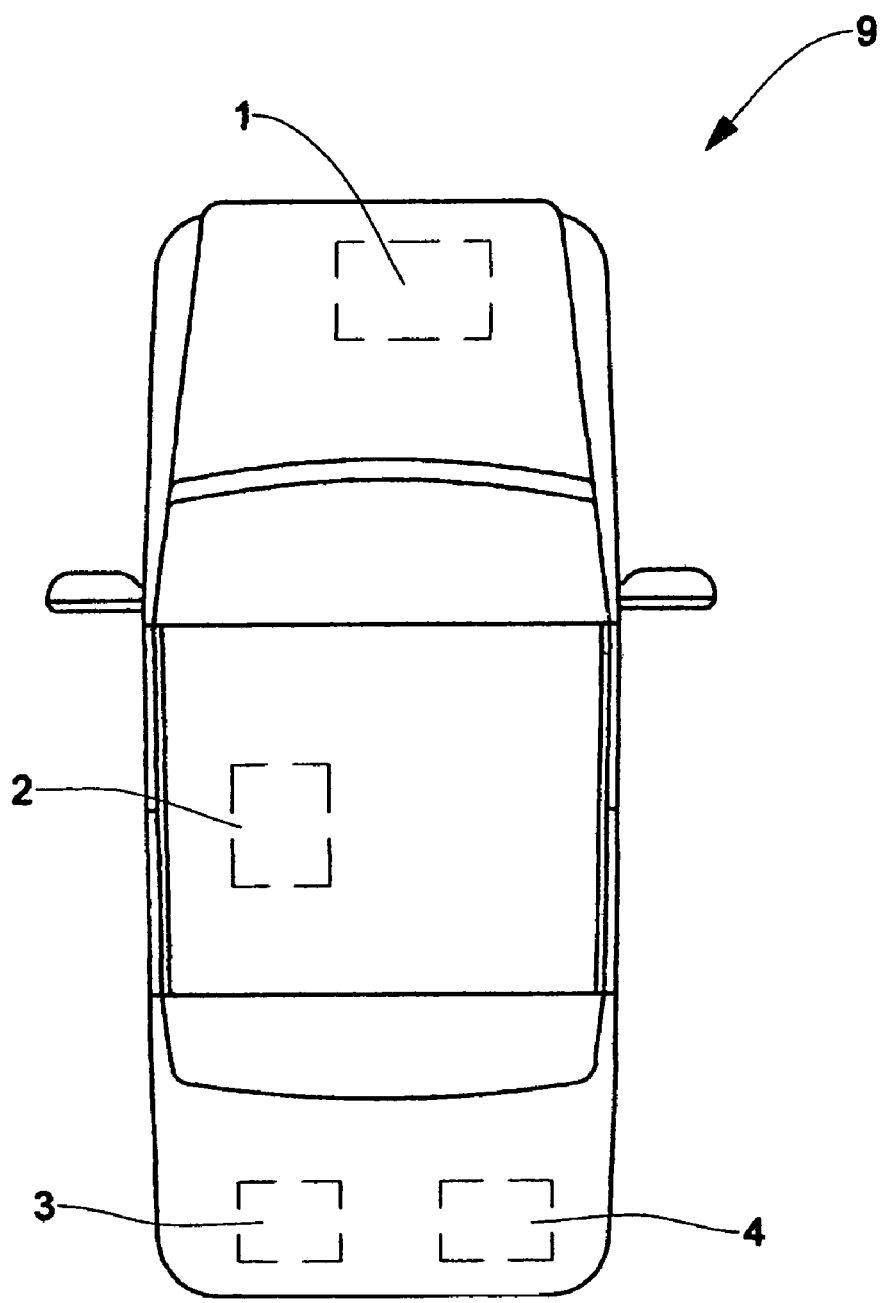
FIG. 1 is a schematic view of the present invention.
Figure 2:
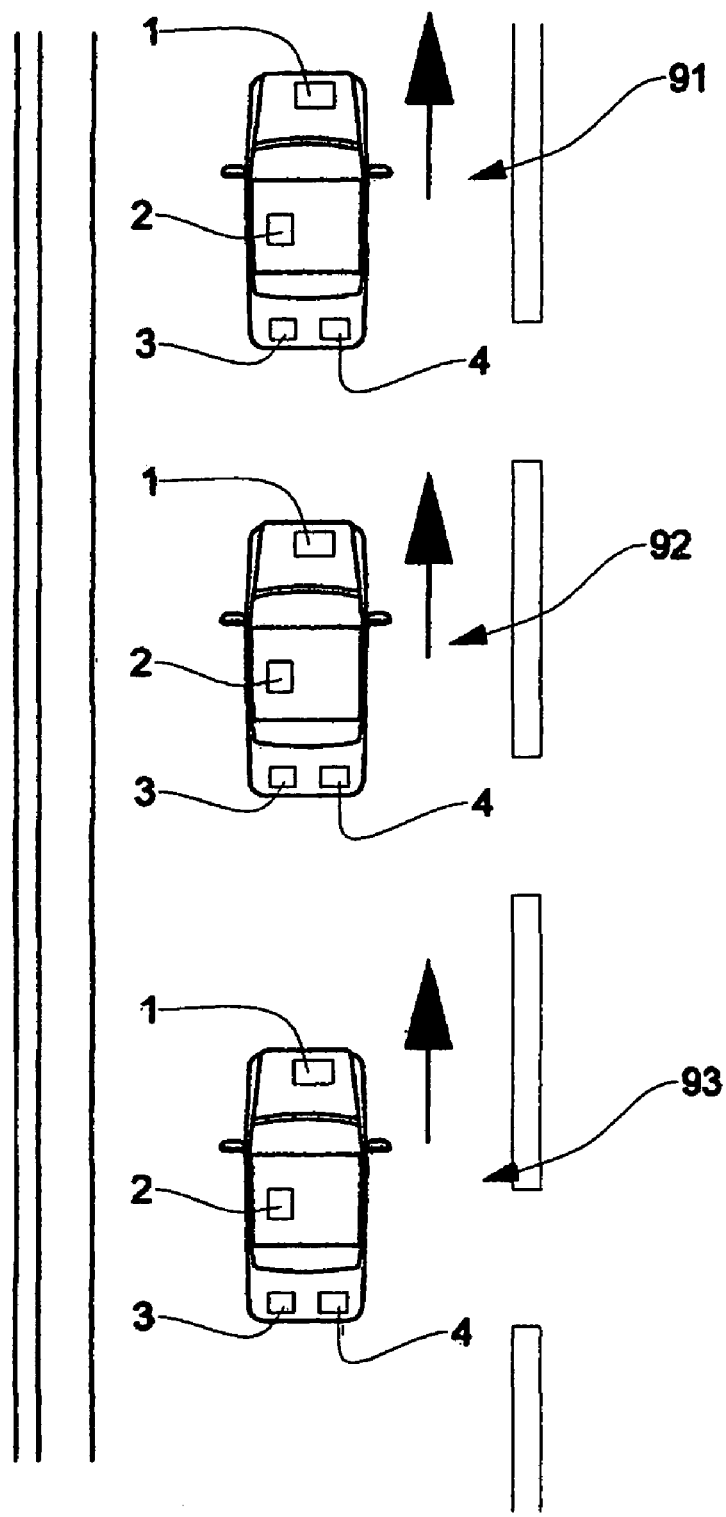
FIG. 2 is a schematic view showing the operation of the present invention.
Figure 3:
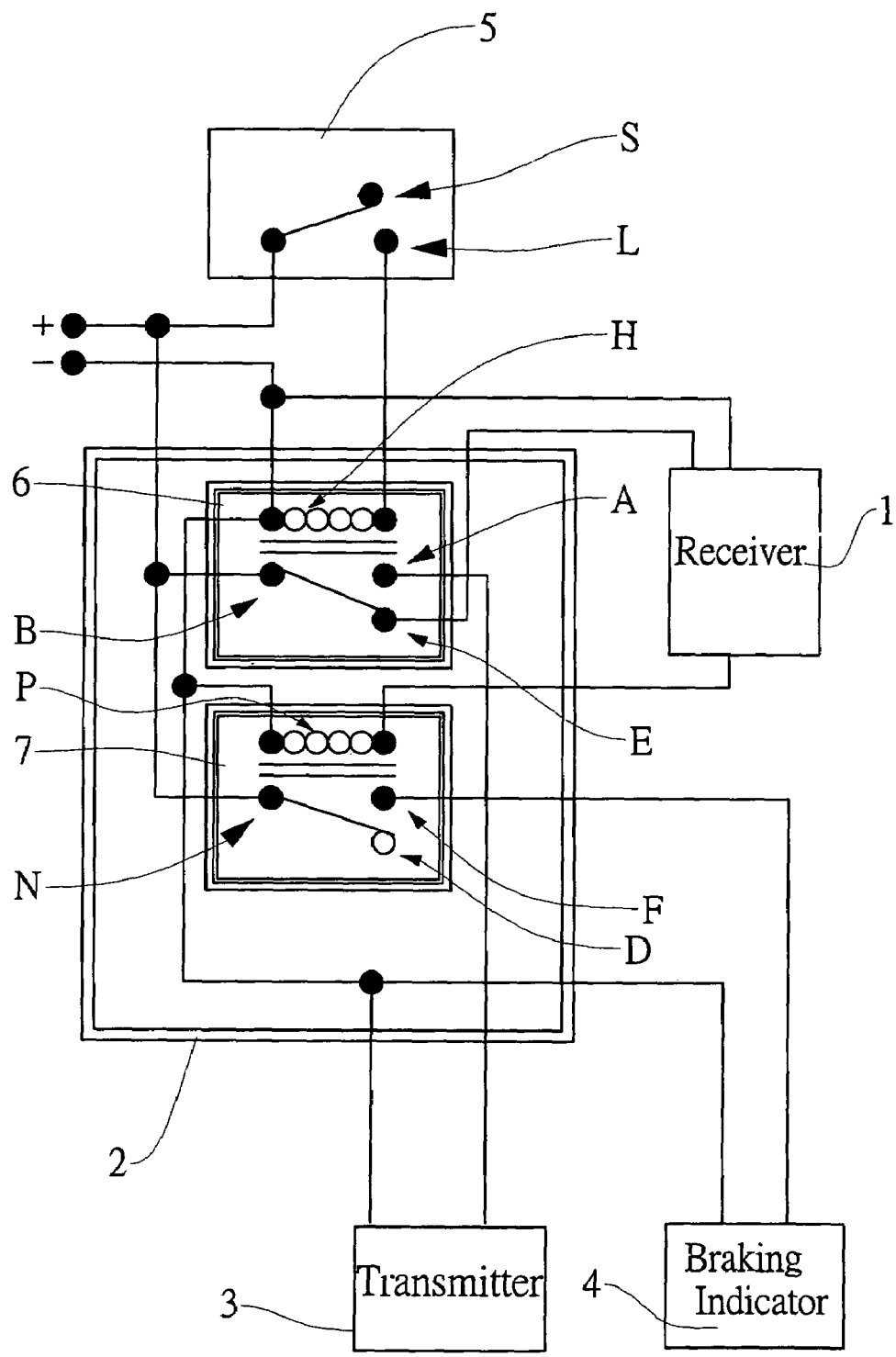
FIG. 3 shows the circuit block diagram of the present invention.

With reference to FIGS. 1 and 3, the vehicle braking alert system of the present invention is illustrated. The vehicle braking alarm system includes a receiver 1, a signal processor 2, a transmitter 3 and a braking indicator 4 installed at a tail portion of a vehicle.

The principle of the present invention will be described herein. In this case, all the vehicles 9 are installed the receiver 1, signal processor 2, transmitter 3 and braking indicator 4. When the vehicles 9 moves, as a first vehicle 91 treads the braking treadle, the original brake lights will light up for alarming the second vehicle 92. At this moment, the signal processor 2 of the first vehicle 91 will emit a signal from the transmitter 3 at the tail thereof so that the receiver 1 of the second vehicle 92 receives this signal. This signal is processed by the signal processor 2 of the second vehicle 92 so that the braking indicator 4 at the tail of the second vehicle 92 lights up. Then the drivers of the third vehicle 93 will know the condition of the first vehicle 91 from the braking indicator 4 of the second vehicle 92. Thereby, the third vehicle 93 can decelerate in advance.

With reference to FIG. 3, the circuit block diagram of the present invention is illustrated.

The receiver 1 serves for receiving signals and then transfers the received signal to the signal processor 2.

The signal processor 2 can be installed at any position of a vehicle for processing the signal received from the signal processor 2 and determining whether it is necessary to transmit a signal from the transmitter and whether the braking indicator 4 is necessary to light up. The signal processor 2 includes a first relay 6 and a second relay 7. The first relay 6 has a coil H, and three joints A, B and E. The second relay 7 includes a coil P and three joints D, N and F. When the first relay is on, the joint B is connected to joint A so as to actuate the transmitter, otherwise the joint B is connected to the joint E. When the second coil is actuated, the power joint N is connected to the load joint F so that the braking indicator lights up for informing the driver in the car behind the current car to decelerate; otherwise the joint N is connected to the joint D.

The transmitter 3 serves for transmitting signals and is installed at a rear portion of a vehicle.

The braking indicator 4 is installed at rear portion of the vehicle, such as the interior of a rear window of a vehicle so that the second vehicle behind the front vehicle having the braking indicator 4 can view the indication from the braking indicator 4 which is different from the original braking lights.

Moreover, a braking treadle 5 including two joints S and L can be installed to the vehicle as a part of the vehicle braking alarm system of the present invention.

As above said, when a vehicle 9 moves, as the vehicles 9 moves and the driver of a first vehicle 91 treads the braking treadle 5, the signal processor 2 of the first vehicle 91 will emit a signal from the transmitter 3 at the rear thereof so that the receiver 1 of the second vehicle 92 receives this signal. The coil P will actuate so that the power joint N is connected to the load joint F and then the braking indicator 4 lights up for informing the drives in the car behind the current car to decelerate. When the driver of the second vehicle 92 brakes the braking treadle 5, the joint S contacts the joint L so that the joint B of coil H of the first relay 6 is switched to the joint A from the joint E. Thereby, the receiver 1 is power-off and the transmitter 3 emits signal to the rear third vehicle 93 for informing the driver in the third vehicle 93.

The present invention is thus described, it will be obvious that the same may be varied in many ways. Such variations are not to be regarded as a departure from the spirit and scope of the present invention, and all such modifications as would be obvious to one skilled in the art ate intended to be included within the scope of the following claims.

What is claimed is:

1. A vehicle braking alert system installed in a vehicle comprising:
    a receiver installed at a head portion of the vehicle for receiving signals from a front vehicle; and transferring the received signals;
    a transmitter at a rear end of a vehicle for emitting signals to a vehicle behind the vehicle having the transmitter;
    a braking indicator at a rear side of the vehicle for indicating a braking condition of the vehicle; and
    a signal processor receiving signals transferred from the receiver for determining to cause the transmitter to emit signals or cause the braking indicator to light up;
    wherein by above components, when a first vehicle installed with the vehicle braking alert system brakes, the transmitter of the first vehicle will emit signals to a second vehicle behind the first vehicle and installed the vehicle braking alert system; the second vehicle receives the signals from the first vehicle so as to light up the braking indicator at the rear side thereof to alert other vehicles behind the second vehicle;
    wherein the signal processor includes
    a first relay having a first coil, and three joints A, B, and E; wherein when the first relay is on, the joint B is connected to joint A so as to actuate the transmitter, otherwise the joint B is connected to the joint E; and
    a second relay having a second coil and three joints D, N and F; wherein the second coil is actuated so that the power joint N is connected to the load joint F so that the braking indicator lights up for informing the driver in the second vehicle to decelerate; otherwise the joint N is connected to the joint D.

2. The vehicle braking alert system as claimed in claim 1, wherein the vehicle braking alert system further comprises a braking treadle which has two joints S and L, when the vehicle is braked, the joint S contacts the joint L to actuate the signal processor.

* * * * *